US012210628B2

United States Patent
Pandita et al.

(10) Patent No.: US 12,210,628 B2
(45) Date of Patent: Jan. 28, 2025

(54) GENERIC FEATURE EXTRACTION FOR IDENTIFYING MALICIOUS PACKAGES

(71) Applicant: Microsoft Technology Licensing, LLC, Redmond, WA (US)

(72) Inventors: Rahul Pandita, Arvada, CO (US); Max Schaefer, Kidlington (GB); Albert Ziegler, Uppsala (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 286 days.

(21) Appl. No.: 17/837,703

(22) Filed: Jun. 10, 2022

(65) Prior Publication Data

US 2023/0401320 A1    Dec. 14, 2023

(51) Int. Cl.
*G06F 21/57*    (2013.01)
*G06N 5/022*    (2023.01)

(52) U.S. Cl.
CPC .......... *G06F 21/577* (2013.01); *G06N 5/022* (2013.01); *G06F 2221/034* (2013.01)

(58) Field of Classification Search
CPC ............. G06F 21/577; G06F 2221/034; G06F 21/562; G06N 5/022; G06N 20/00
See application file for complete search history.

(56) References Cited

FOREIGN PATENT DOCUMENTS

| CN | 107123027 B | * | 6/2021 | ......... G06K 9/00228 |
| KR | 20180008517 A | * | 1/2018 | |

OTHER PUBLICATIONS

"Application as Filed in U.S. Appl. No. 17/673,142", filed Feb. 16, 2022, 35 Pages.
Bui, et al., "Bilateral Dependency Neural Networks for Cross-Language Algorithm Classification", in Proceedings of the IEEE 26th International Conference on Software Analysis, Evolution and Reengineering, Feb. 24, 2019, pp. 422-433.
"International Search Report and Written Opinion Issued in PCT Application No. PCT/US23/021085", Mailed Date: Aug. 4, 2023, 10 Pages.
Sejfia, et al., "Practical Automated Detection of Malicious npm Packages", in repository of Arxiv Code: 2202.13953v1 [cs.CR], Feb. 28, 2022, 12 Pages.

* cited by examiner

*Primary Examiner* — Mohammed Waliullah
(74) *Attorney, Agent, or Firm* — Workman Nydegger

(57) ABSTRACT

Classifying packages based on generic feature extraction. A computer system identifies a set of training packages, including a first subset known to be malicious, and a second subset known to be benign. The computer system extracts a set of training feature vectors from the set of training packages by inputting each training package to a feature extraction model, which generates a training feature vector for each training package. The computer system trains a classification model using the set of training feature vectors. After training the classification model using the set of training feature vectors, a subject package is classified as malicious or benign based on extracting a feature vector for the subject package by inputting the subject package to the feature extraction model, and inputting the feature vector to the classification model.

20 Claims, 4 Drawing Sheets

GENERIC FEATURE EXTRACTION FOR IDENTIFYING MALICIOUS PACKAGES

BACKGROUND

Software repositories are commonly provided to host and distribute software packages (packages) comprising executable binaries, source code, data files, configuration files, and the like. Some software repositories (e.g., application distribution repositories) are used to distribute entire applications; for example, many Linux distributions provide software repositories that host application packages using the RPM package manager format, the Debian (deb) package manager format, and the like. Other software repositories (e.g., source code repositories) are used to distribute source code projects; examples are GitHub and GitLab. Yet other software repositories (e.g., code library repositories) are used to distribute programming language-specific libraries, frameworks, and even entire applications; for example, npm is a repository for JavaScript and Type-Script code libraries, and PyPI is a repository for Python code libraries. Yet other software repositories (e.g., container repositories) are used to distribute containerized applications; an example is the Docker Hub.

Software repositories have become a prime target for malicious actors, who publish new packages, or compromise existing packages, to introduce malware to the software repository. This can be particularly troublesome, since this malware affects any package that depends on a malicious package, even transitively. Malware can tamper with data on a machine on which it installed, can exfiltrate data from a machine on which it installed, can steal computing resources-such as by performing parasitical computations (e.g., Bitcoin mining), and/or engage in other malicious activities. Defending against the introduction of malicious packages into software repositories protects the integrity of the software supply chain; however, the sheer volume of package updates can make comprehensive manual review infeasible. For example, each day developers publish tens of thousands of package updates, as well as hundreds of new packages, to the npm repository alone.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In some aspects, the techniques described herein relate to a method, implemented at a computer system that includes a processor, for classifying packages based on generic feature extraction, the method including: identifying a set of training packages, the set of training packages including a first subset of training packages that are known to be malicious, and a second subset of training packages that are known to be benign; extracting a set of training feature vectors from the set of training packages, including inputting each training package in the set of training packages to a feature extraction model which generates at least one corresponding training feature vector for each training package in the set of training packages, the set of training feature vectors including a first subset of training feature vectors extracted from the first subset of training packages that are known to be malicious and a second subset of training feature vectors extracted from the second subset of training packages that are known to be benign; training a classification model using the set of training feature vectors; and after training the classification model using the set of training feature vectors, classifying a subject package as malicious or benign based on: extracting a feature vector for the subject package by inputting the subject package to the feature extraction model; and inputting the feature vector to the classification model.

In some aspects, the techniques described herein relate to a computer system for classifying packages based on generic feature extraction, including: a processor; and a computer storage media that stores computer-executable instructions that are executable by the processor to cause the computer system to at least: identify a set of training packages, the set of training packages including a first subset of training packages that are known to be malicious, and a second subset of training packages that are known to be benign; extract a set of training feature vectors from the set of training packages, including inputting each training package in the set of training packages to a feature extraction model which generates at least one corresponding training feature vector for each training package in the set of training packages, the set of training feature vectors including a first subset of training feature vectors extracted from the first subset of training packages that are known to be malicious and a second subset of training feature vectors extracted from the second subset of training packages that are known to be benign; train a classification model using the set of training feature vectors; and after training the classification model using the set of training feature vectors, classify a subject package as malicious or benign based on: extracting a feature vector for the subject package by inputting the subject package to the feature extraction model; and inputting the feature vector to the classification model.

In some aspects, the techniques described herein relate to a computer program product including a computer storage media that stores computer-executable instructions that are executable by a processor to cause a computer system to classify packages based on generic feature extraction, the computer-executable instructions including instructions that are executable by the processor to cause the computer system to at least: identify a set of training packages, the set of training packages including a first subset of training packages that are known to be malicious, and a second subset of training packages that are known to be benign; extract a set of training feature vectors from the set of training packages, including inputting each training package in the set of training packages to a feature extraction model which generates at least one corresponding training feature vector for each training package in the set of training packages, the set of training feature vectors including a first subset of training feature vectors extracted from the first subset of training packages that are known to be malicious and a second subset of training feature vectors extracted from the second subset of training packages that are known to be benign; train a classification model using the set of training feature vectors; and after training the classification model using the set of training feature vectors, classify a subject package as malicious or benign based on: extracting a feature vector for the subject package by inputting the subject package to the feature extraction model; and inputting the feature vector to the classification model.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the advantages and features of the systems and methods described herein can be obtained, a more particular description of the embodiments briefly described above will be rendered by reference to specific embodiments thereof which are illustrated in the appended drawings. Understanding that these drawings depict only typical embodiments of the systems and methods described herein, and are not therefore to be considered to be limiting of their scope, certain systems and methods will be described and explained with additional specificity and detail through the use of the accompanying drawings in which.

DETAILED DESCRIPTION

Figure 1:
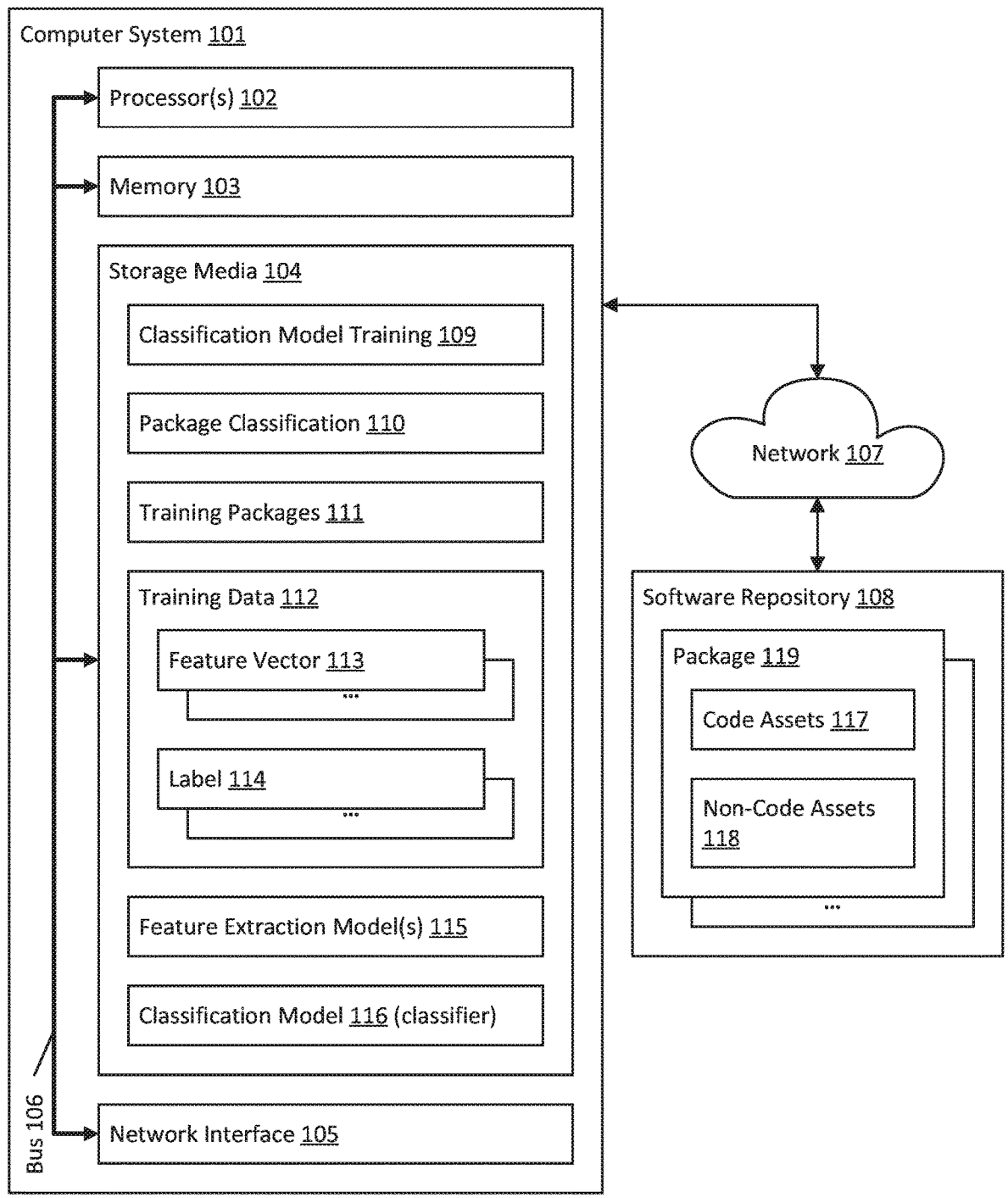
FIG. 1 illustrates an example computer architecture that facilitates generic feature extraction for identifying malicious package versions.

The inventors have recognized that, due to the large number of packages being published on software repositories (e.g., Linux application distribution repositories, GitHub, npm, PyPI, Docker Hub, etc.) every day, comprehensive manual auditing of those published packages is infeasible, and automated techniques are therefore needed. Prior automated malicious package detection techniques rely on domain-specific expertise (e.g., expertise on a given programming language/package ecosystem). For example, Applicant's patent application, U.S. patent Ser. No. 17/673,142, titled AUTOMATED DETECTION OF MALICIOUS PACKAGES IN A SOFTWARE REPOSITORY, describes techniques that rely on the domain-specific expertise of a software repository to identify and extract relevant features from packages within the repository, and to train classifiers based on those features. While package classification techniques that rely on domain-specific expertise have shown to be effective, they need to be repeated for each new domain (e.g., language/package ecosystem). Additionally, package classification techniques that rely on domain-specific expertise are often time-consuming to develop, and involve a lot of trial and error (e.g., in determining which features to extract from a package).

In contrast to techniques that rely on domain-specific expertise, the embodiments described herein detect potentially malicious package versions in software repositories in a generic manner that can be performed automatically, and that is applicable to a variety of programming languages, package repositories, and package types. In particular, rather than using domain-specific expertise to identify and extract relevant features from packages, the embodiments described herein use feature extraction models to perform generic feature extraction from packages, resulting in feature vectors for those packages. Then, the embodiments, herein use these feature vectors to train a classification model. Thus, the embodiments herein train a classification model for a package repository without any need for domain-specific expertise.

Any type of machine learning algorithm, model, machine learning, or neural network may be used by the embodiments herein. As used herein, reference to "machine learning" or to a machine learning model or to a "neural network" may include any type of machine learning algorithm or device, neural network (e.g., convolutional neural network(s), multilayer neural network(s), recursive neural network(s), deep neural network(s), dynamic neural network(s), etc.), decision tree model(s) (e.g., decision trees, random forests, and gradient boosted trees), linear regression model(s) or logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

As used herein, a "malicious package version" is a version of a package that contains code that implements malicious behavior. As examples, malicious behavior includes exfiltrating sensitive or personal data, tampering with or destroying data, or performing long running or computationally expensive computations (e.g., that are not explicitly documented). In embodiments, a given package version is considered malicious even if the malicious code it contains is disabled, broken, or unintentional. For brevity, the term "malicious package version" is frequently shortened herein to "malicious package."

From an attacker's perspective, there are three steps to delivering malware through a software repository-step one: publish a malicious package version; step two: get users to install that malicious package; and step three: get users to run the malicious code within the malicious package.

One way to go about step one is to publish a completely new package. A classic way of achieving step two in this scenario is "typosquatting" whereby the name chosen for the new package is very similar to the name of an existing package (preferably, a popular package). Then, a user who accidentally misspells the name of the existing package will end up inadvertently installing the malicious package instead.

A more sophisticated approach to achieve step one is dependency confusion: the attacker identifies dependencies on a private package hosted in a private software repository, and then publishes a malicious package with the same name and a higher version number on a public software repository. Step two is then achieved if clients of the private package end up installing the malicious package instead. Additionally, there have been cases of attackers publishing an initially benign and useful package, getting it added as a dependency to a popular target package, and then publishing a malicious version of that package.

Another approach to achieve step one is for the attacker to compromise an existing benign package by gaining maintainer access (e.g., by stealing maintainer credentials or by social engineering), and then publishing a new, malicious version of that package. In this case, step two comes about naturally since the package already has users who will (either explicitly or implicitly) upgrade to the malicious version.

A tactic to achieve step three in any scenario is to embed installation scripts, which are run during package installation, and which can execute arbitrary code. However, in some package management systems the commands run by installation scripts may be logged, increasing the risk of detection. Hence, a more careful attacker may instead choose to hide their malicious code in some frequently executed bit of functionality in the main body of the package.

FIG. 1 illustrates an example computer architecture 100 that facilitates generic feature extraction for identifying malicious package versions. As shown, computer architecture 100 includes a computer system 101 comprising processor(s) 102 (e.g., a single processor, or a plurality of processors), memory 103 (e.g., system or main memory), storage media 104 (e.g., a single computer-readable storage medium, or a plurality of computer-readable storage media), and a network interface 105 (e.g., one or more network interface cards), all interconnected by a bus 106.

As shown, computer architecture 100 also includes a software repository 108 (e.g., single software repository, or a plurality of software repositories). In computer architecture 100, the computer system 101 and the software repository 108 are interconnected by a network 107; however, the software repository 108 could alternatively be integral to computer system 101.

The software repository 108 stores a plurality of packages, including package 119. Package 119, in turn, includes code assets 117 and non-code assets 118. In embodiments, code assets 117 include one or more binaryfiles, one or more scripts (e.g., installation scripts), one or more source code files, and the like. In embodiments, non-code assets 118 include metadata (e.g., information about the package, itself, such as package name, package version, a changelog, a location of a corresponding package source repository), documentation, image assets, and the like.

The storage media 104 is illustrated as storing computer-executable instructions implementing at least a classification model training component 109 (referred to hereinafter as "classifier training component 109") and a package classification component 110 (referred to hereinafter "classification component 110"). The storage media 104 is also illustrated as storing training packages 111, training data 112, a feature extraction model 115 (or a plurality of feature extraction models), and a classification model 116 (or classifier). In embodiments, one or more of the training packages 111, training data 112, the feature extraction model 115, or the classification model 116 are alternatively stored elsewhere, such as in the memory 103 and/or at a computer system interconnected to computer system 101 via the network 107.

In embodiments, the classifier training component 109 trains the classification model 116 based on the training packages 111, such that the classification model 116 is usable to automatically classify package versions obtained from the software repository 108 (or a plurality of software repositories) as being malicious or benign.

In embodiments, the training packages 111 includes, or at least identifies (e.g., within the software repository 108), a corpus of example package versions that are known to be malicious or benign (e.g., based on a human review, based on the previous operation of the classification component 110). In embodiments, the classifier training component 109 generates training data 112 from the training packages 111, and uses the training data 112 to train the classification model 116. The training data 112 is shown is including at least one feature vector 113 (e.g., for each package in the training packages 111) and a label 114 for each feature vector 113 (e.g., labeling the feature vector as corresponding to a malicious or benign package version).

In embodiments, rather than using domain-specific knowledge of the training packages 111 to generate the training data 112, the classifier training component 109 uses the feature extraction model 115 to generically extract features from the training packages 111 to generate each feature vector 113.

Figure 2A:
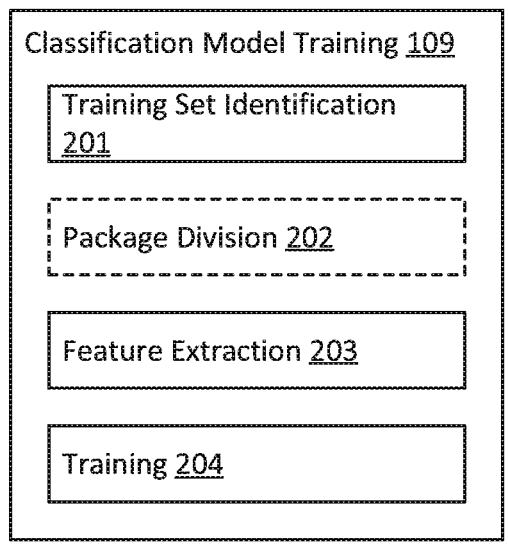
FIG. 2A illustrates an example of internal components of a classification model training component, which trains a classification model using generic feature extraction.
Figure 3A:
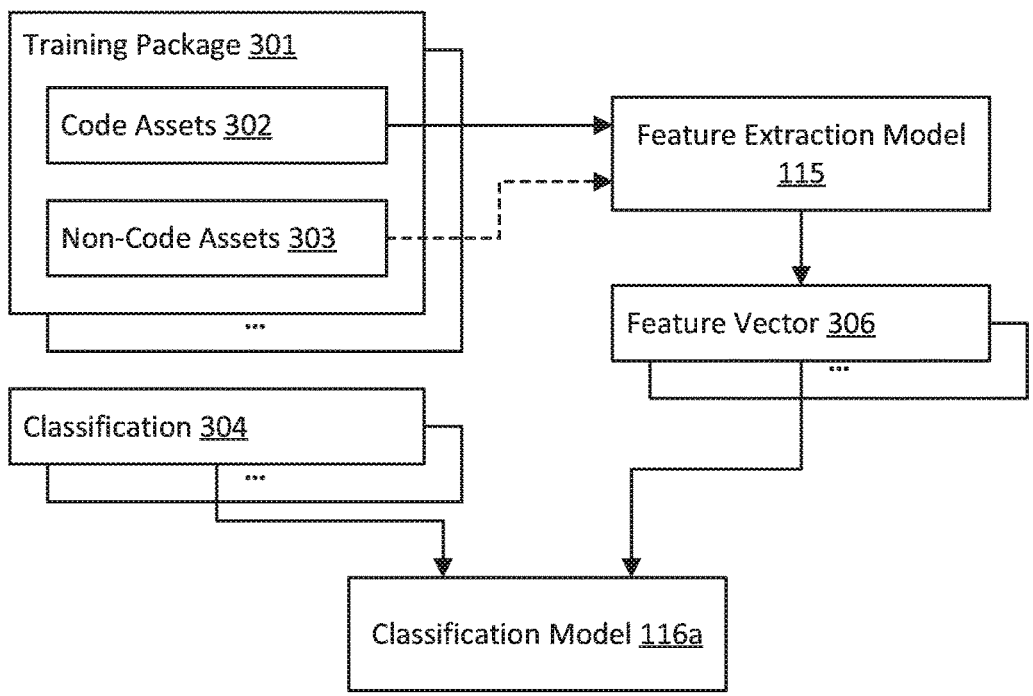
FIG. 3A illustrates an example process flow of training a classification model using generic feature extraction.

FIG. 2A illustrates an example 200a of internal components of the classifier training component 109 of FIG. 1, which trains a classification model using generic feature extraction. Additionally, FIG. 3A illustrates an example process flow 300a of training a classification model using generic feature extraction. Each internal component of the classifier training component 109 depicted in FIG. 2A represents various functionalities that the classifier training component 109 might implement in accordance with various embodiments described herein. It will be appreciated, however, that the depicted components-including their identity and arrangement—are presented merely as an aid in describing example embodiments of the classifier training component 109.

In FIG. 2A, the classifier training component 109 includes a training set identification component 201, which determines a set of training packages (e.g., training packages 111) from which the classification model 116 will be trained for classifying package versions as malicious or benign. FIG. 3A illustrates an example of a training package 301 that is included in a set of training packages identified by the training set identification component 201. As shown in FIG. 3A, the training package 301 includes code assets 302 (e.g., binary files, scripts, source code files) and non-code assets 303 (e.g., package metadata, documentation, image assets). Additionally, as shown in FIG. 3A, the set of training packages is associated with a set of classifications (e.g., malicious, or benign), such as classification 304 for training package 301.

In FIG. 2A, the classifier training component 109 also includes a feature extraction component 203, which generically extracts features from training packages, based on providing at least a portion of each training package to the feature extraction model 115. As a result, the feature extraction component 203 generates at least one feature vector (e.g., feature vector 113) as part of training data 112 for training the classification model 116. While the feature extraction component 203 could operate on a single version of a given training package, in embodiments the feature extraction component 203 extracts feature vector(s) based on differences between a given version of a training package and a previous version of the training package. In embodiments, when operating on an initial version of a training package, the feature extraction component 203 treats the previous version of the training package as having been empty.

FIG. 3A illustrates that the feature extraction component 203 provides one or more portions of code assets 302 as an input to the feature extraction model 115. In one example, the feature extraction component 203 provides portion(s) of code assets 302 that have changed since a prior version of the training package 301. In some embodiments, the feature extraction component 203 also provides one or more portions of non-code assets 303 as the input to the feature extraction model 115. In one example, the feature extraction component 203 provides portion(s) of non-code assets 303 that have changed since a prior version of the training package 301. FIG. 3A also shows that, as a result of having provided portion(s) of a training package 301 as an input to the feature extraction model 115, the feature extraction model 115 produces at least one feature vector (e.g., feature vector 306) for that training package 301.

In some embodiments, the feature extraction component 203 utilizes multiple feature extraction models. For example, the feature extraction component 203 provides portion(s) of a training package 301 as inputs to two different feature extraction models, resulting in different sets of one or more feature vectors for the training package 301, with each set having been generated by a different feature extraction model.

Notably, the classifier training component 109 is illustrated as potentially including a package division component 202. In some embodiments, a feature extraction model 115 is constrained in the size of inputs it can receive (e.g., a fixed number of characters). In embodiments, the package division component 202 determines different divisions of a training package 301 (e.g., as fixed-size portions that fit constraints of the feature extraction model 115) to provide as individual inputs to the feature extraction model 115, and the feature extraction component 203 provides each of these divisions as different inputs to the feature extraction model 115. Thus, the feature extraction model 115 produces at least one feature vector for each of these divisions of the training package.

In some embodiments, the feature extraction model 115 is a code embedding model, such as a generative pre-trained transformer (GPT)-based model from OPENAI of San Francisco California, or codeBERT from MICROSOFT CORPORATION of Redmond Washington.

In these embodiments, the feature extraction model 115 generates a general-purpose representation of input code as an array of values (e.g., float values). In these embodiments, this array is the feature vector (e.g., feature vector 306) generated by the feature extraction model 115. Since a code embedding model may generate an array comprising hundreds or thousands of values, the feature vector generated by a code embedding model is referred to as a "high-dimensional" feature vector. In embodiments, each dimension in the feature vector captures some semantic aspect of the input code, as determined by the feature extraction model 115.

In other embodiments, the feature extraction model 115 uses term frequency and inverse document frequency (TF-IDF)-based feature extraction. In these embodiments, the feature extraction model 115 computes a set of TF-IDF vectors for portions of a training package 301 (e.g., one TF-IDF vector for each file in the code assets 302) based on alphanumeric tokens. The feature extraction component 203 then identifies distinguishing tokens from the set of TF-IDF vectors (e.g., using a statistical test), and projects the computed TF-IDF vectors to that vocabulary to produce one or more feature vectors (e.g., feature vector 306).

In FIG. 2A, the classifier training component 109 also includes a training component 204, which trains the classification model 116 using the feature vector(s) (e.g., feature vector 306) generated by the feature extraction component 203, together with the classification(s) (e.g., classification 304) for the training packages. In embodiments, the training component 204 uses each dimension represented in a feature vector as different a feature for training the classification model 116, and uses the classifications to label (e.g., label 114) a given feature vector as malicious or benign. FIG. 3A shows that feature vectors(s) and classification(s) are provided to classification model 116a, which transforms the classification model into a trained classification model 116b (see FIG. 3B).

Figure 2B:
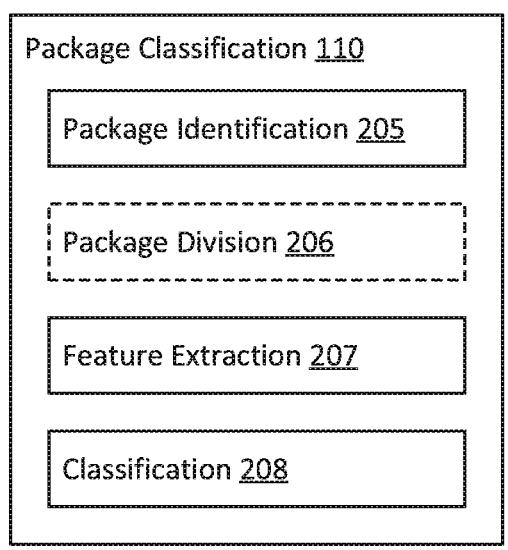
FIG. 2B illustrates an example of internal components of a package classification component, which classifies a package using a classification model that is trained using generic feature extraction.
Figure 3B:
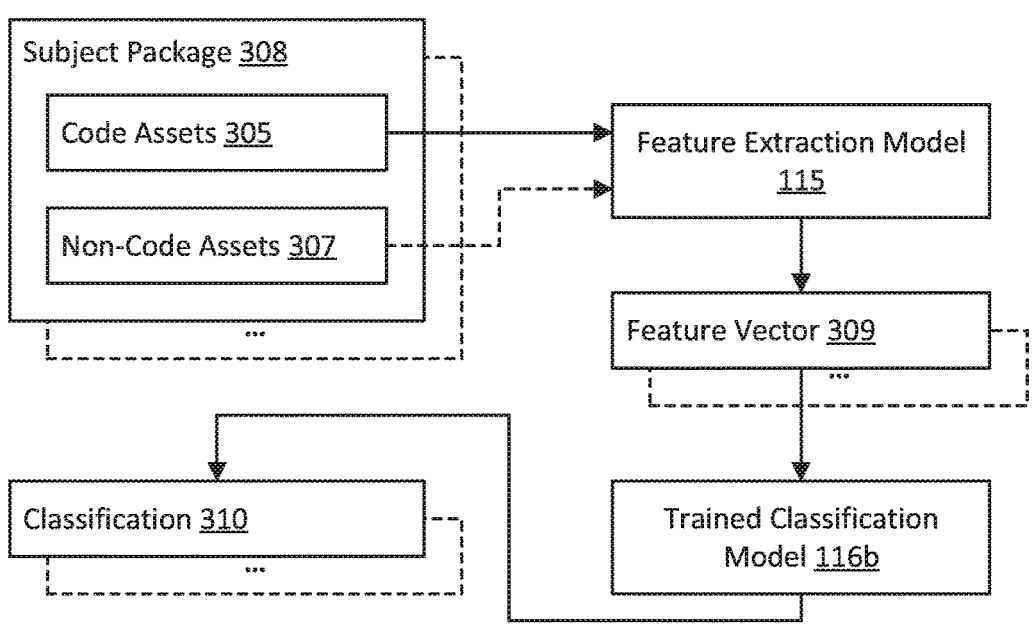
FIG. 3B illustrates an example process flow of classifying a package based on a classification model that is trained using generic feature extraction.

In embodiments, the classification component 110 uses the feature extraction model 115 and the classification model 116 (once trained, e.g., as trained classification model 116b) to classify versions of subject package(s)—such as packages submitted to the software repository 108—as being malicious or benign. FIG. 2B illustrates an example 200b of internal components of the classification component 110 of FIG. 1, which classifies a package using a classification model that is trained using generic feature extraction. Additionally, FIG. 3B illustrates an example process flow 300b of classifying a package based on a classification model that is trained using generic feature extraction. Each internal component of the classification component 110 depicted in FIG. 2B represents various functionalities that the classification component 110 might implement in accordance with various embodiments described herein. It will be appreciated, however, that the depicted components—including their identity and arrangement—are presented merely as an aid in describing example embodiments of the classification component 110.

In FIG. 2B, the classification component 110 includes a package identification component 205, which determines subject package version(s) (e.g., package 119) to classify as malicious or benign. FIG. 3B illustrates an example of a version of a subject package 308. As shown in FIG. 3A, the subject package 308 includes code assets 305 (e.g., binary files, scripts, source code files) and non-code assets 307 (e.g., package metadata, documentation, image assets).

In FIG. 2B, the classification component 110 also includes a feature extraction component 207, which—similar to the feature extraction component 203 of the classifier training component 109—generically extracts features from the subject package version(s), based on providing at least a portion of each subject package version to the feature extraction model 115 (e.g., a code embedding model and/or TF-IDF-based feature extraction). As a result, a feature extraction component 207 generates one or more feature vectors for each subject package version. Similar to the feature extraction component 203, the feature extraction component 207 could operate on a single version of a given subject package. However, in embodiments, the feature extraction component 207 extracts feature vector(s) based on differences between a given version of a subject package and a previous version of the subject package. In embodiments, when operating on an initial version of a subject package, the feature extraction component 207 treats the previous version of the subject package as having been empty.

FIG. 3B shows that, as a result of having provided portion(s) of subject package 308 (e.g., portion(s) of code assets 305 and/or non-code assets 307 that have changed since a prior version of the subject package 308) as an input to the feature extraction model 115, the feature extraction model 115 produces at least one feature vector (e.g., feature vector 309) for that version of the subject package 308.

In some embodiments, the feature extraction component 207 utilizes multiple feature extraction models. For example, the feature extraction component 207 provides portion(s) of subject package 308 as inputs to two different feature extraction models, resulting in different sets of one or more feature vectors for the version of the subject package 308, with each set having been generated by a different feature extraction model.

In FIG. 2B, the classification component 110 may also include a package division component 206, which operates similarly to the package division component 202 of the classifier training component 109. Thus, in embodiments, the package division component 206 determines different divisions of a version of a subject package 308 (e.g., as fixed-size portions that fit constraints of the feature extraction model 115) to provide as individual inputs to the feature extraction model 115, and feature extraction component 207 provides each of these divisions as different inputs to the feature extraction model 115. Thus, the feature extraction model 115 produces at least one feature vector for each of these divisions of the subject package.

In FIG. 2B, the classification component 110 also includes a classification component 208, which provides feature vector(s) associated with a version of a subject package to the classification model 116, in order to generate a classification (e.g., malicious, or benign) for the subject package version. For example, FIG. 3B shows that the classification component 208 provides feature vector 309 to the trained classification model 116*b*, to generate classification 310 for the subject package 308.

As will be appreciated in view of the disclosure herein, a given version of a subject package may be associated with a plurality of feature vectors. For example, the subject package may be divided into different divisions using the package division component 206 and/or the feature extraction component 207 could utilize more than one feature extraction model. When providing a plurality of feature vectors associated with a version of a subject package to the classification model 116, the classification model 116 could classify some of those vectors as being malicious, and classify some of them as being benign. In embodiments, the classification component 110 considers a given package version to be malicious if at least one of its corresponding vectors is considered malicious. However, different approaches are possible, such as to consider a package version to be malicious if all of its feature vectors are classified as malicious, if more than half of its feature vectors are classified as malicious, etc.

In some embodiments, computer system 101 automatically removes package versions detected to be malicious from the software repository 108. In other embodiments, the computer system 101 submits those packages for human review. In some embodiments, the classification component 110 also classifies malicious package versions with a review priority, such as based on a download count, a dependency count, a user rating, and the like.

In embodiments, the results of the classification component 110 are used to refine the training data and re-train the classification model 116. For example, if a package version is classified as malicious, it is added to the training packages 111 with a malicious classification, and if the package version is classified as benign, it is added to the training packages 111 with a benign classification. The classifier training component 109 subsequently re-trains the classification model 116 based on the addition to the training packages 111.

Embodiments are now described in connection with FIG. 4, which illustrates a flow chart of an example method 400 for classifying packages based on generic feature extraction. In embodiments, instructions for implementing method 400 are encoded as computer-executable instructions (e.g., classifier training component 109, classification component 110) stored on a computer storage media (e.g., storage media 104) that are executable by a processor (e.g., processor 102) to cause a computer system (e.g., computer system 101) to perform method 400.

The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

Figure 4:
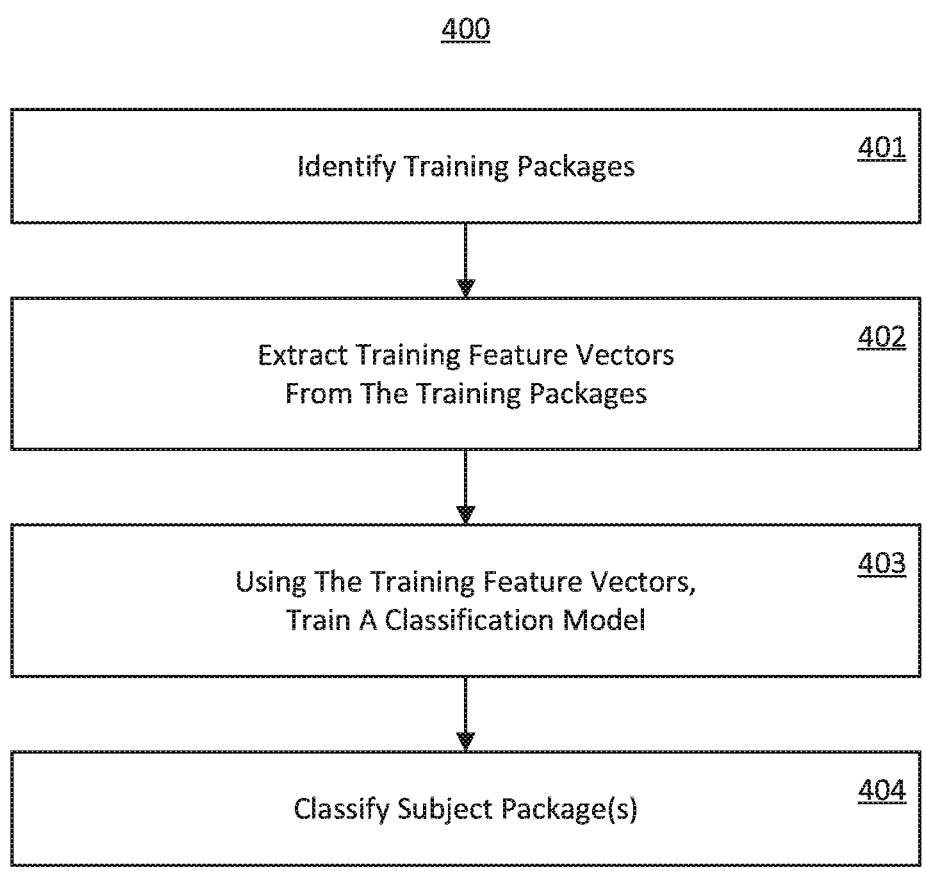
FIG. 4 illustrates a flow chart of an example method for classifying packages based on generic feature extraction.

Referring to FIG. 4, in embodiments, method 400 comprises an act 401 of identifying training packages. In some embodiments, act 401 comprises identifying a set of training packages, the set of training packages including a first subset of training packages that are known to be malicious, and a second subset of training packages that are known to be benign. In an example, the training set identification component 201 identifies training packages 111, which includes, or at least identifies (e.g., within software repository 108), a corpus of example package versions that are known to be malicious or benign (e.g., based on a human review, based on the previous operation of the classification component 110).

Method 400 also comprises an act 402 of extracting training feature vectors from the training packages. In some embodiments, act 402 comprises extracting a set of training feature vectors from the set of training packages, including inputting each training package in the set of training packages to a feature extraction model which generates at least one corresponding training feature vector for each training package in the set of training packages. In embodiments, the set of training feature vectors include a first subset of training feature vectors extracted from the first subset of training packages that are known to be malicious, and a second subset of training feature vectors extracted from the second subset of training packages that are known to be benign. In an example, the feature extraction component 203 inputs portion(s) of each package version in the training packages 111 to the feature extraction model 115 (or to a plurality feature extraction models). In embodiments, the feature extraction component 203 extracts features based on differences between a current and previous version of each package. For each of these training packages 111, the feature extraction model(s) 115 produce a corresponding set of one or more feature vectors. For example, as shown in FIG. 3A, the feature extraction component 203 inputs portion(s) of training package 301 (e.g., at least part of code assets 302) to the feature extraction model 115, resulting in the generation of feature vector 306. In embodiments, an effect of act 402 is to generically extract features from the training package, without needing any domain-specific expert knowledge about the training package.

As discussed, in some embodiments, the feature extraction model(s) 115 include a code embedding model, such as a GPT-based model, codeBERT, etc. Thus, in embodiments, the feature extraction model is a code embedding model. As discussed, in some embodiments, the feature extraction model(s) 115 include TF-IDF-based feature extraction model. Thus, in embodiments, the feature extraction model is a TF-IDF model.

In embodiments of act 402, the package division component 202 determines different divisions of a version of a subject package 308 (e.g., as fixed-size portions that fit constraints of the feature extraction model) to provide as individual inputs to the feature extraction model. Thus, in embodiments, for at least one training package, inputting the at least one training package to the feature extraction model includes generating a plurality of portions from the at least one training package, and inputting each portion to the feature extraction model which generates a different training feature vector for each portion. In some embodiments, the plurality of portions are generated based on a rolling window having a predetermined window size and a predetermined step size.

Method 400 also comprises an act 403 of, using the training feature vectors, training a classification model. In an example, the training component 204 inputs feature vector 306, together with classification 304 (e.g., whether the training package 301 was malicious our benign) to the classification model 116a, as part of producing trained classification model 116b. In embodiments, the classification model is based on at least one of decision trees, random forests, SVM, logistic regression, naïve bayes, or K-nearest neighbors.

Method 400 also comprises an act 404 of classifying subject package(s). In some embodiments, act 404 comprises, after training the classification model using the set of training feature vectors, classifying a subject package as malicious or benign based on extracting a feature vector for the subject package by inputting the subject package to the feature extraction model; and inputting the feature vector to the classification model. In an example, and referring to FIG. 3B, the classification component 110 uses the feature extraction model 115 to extract feature vector 309 for a version of subject package 308 (e.g., using feature extraction component 207), and then inputs this feature vector 309 to trained classification model 116b to generate classification 310 for that version of the subject package 308 (e.g., using classification component 208).

Notably, since method 400 relies on generic feature extraction, in embodiments a classification model that is trained based on packages from one domain (e.g., training packages that comprise a first programming language, such as JavaScript) can be used to classify packages from another domain (e.g., training packages that comprise a second programming language, such as Python). Thus, in embodiments, the set of training packages is written in a first programming language, and the subject package is written in a second programming language that is different from the first programming language.

In embodiments, an effect of method 400 is to detect potentially malicious package versions in a software repository in a generic manner that can be performed automatically, and that is applicable to a variety of programming languages, package repositories, and package types.

In some embodiments, method 400 is combined with other automated malicious package detection techniques, such as those that rely on domain-specific expertise. In embodiments, a hybrid approach comprises using an automated malicious package detection technique that relies on domain-specific features to identify a set of candidate malicious package versions. Then, when selecting subject package(s) to classify as part of method 400, these embodiments select those subject package(s) from this set of candidate malicious package versions. In embodiments, only package versions that are classified as malicious by both techniques are ultimately reported as being malicious or suspicious. Thus, in some embodiments of method 400, the subject package is selected from a set of candidate packages identified using domain-specific expertise.

Embodiments of the disclosure may comprise or utilize a special-purpose or general-purpose computer system (e.g., computer system 101) that includes computer hardware, such as, for example, one or more processors (e.g., processor 102) and system memory (e.g., memory 103), as discussed in greater detail below. Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media (e.g., storage media 104). Computer-readable media that carry computer-executable instructions and/or data structures are transmission media. Thus, by way of example, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EEPROM), solid-state drives (SSDs), flash memory, phase-change memory (PCM), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface 105), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

It will be appreciated that the disclosed systems and methods may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. Embodiments of the disclosure may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

It will also be appreciated that the embodiments of the disclosure may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as, for example, Software as a Service (SaaS), Platform as a Service (PaaS), and Infrastructure as a Service (IaaS). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from the view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present disclosure may be embodied in other specific forms without departing from its essential characteristics. The described embodiments are to be considered in all respects only as illustrative and not restrictive. All changes which come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method, implemented in a computer system that includes a processor, for classifying packages based on generic feature extraction, the method comprising:
    identifying a set of training packages, the set of training packages including a first subset of training packages that are known to be malicious, and a second subset of training packages that are known to be benign;
    determining a corresponding set of differences for each training package in the set of training packages, each corresponding set of differences including one or more differences between a first code asset in a current version of the training package and a second code asset in a prior version of the training package;
    extracting a set of training feature vectors from the set of training packages, including inputting the corresponding set of differences for each training package in the set of training packages to a feature extraction model which generates at least one corresponding training feature vector for each training package in the set of training packages, the set of training feature vectors including a first subset of training feature vectors extracted from the first subset of training packages that are known to be malicious and a second subset of training feature vectors extracted from the second subset of training packages that are known to be benign;
    training a classification model using the set of training feature vectors; and
    after training the classification model using the set of training feature vectors, classifying a subject package as malicious or benign based on:
        extracting a feature vector for the subject package by inputting the subject package to the feature extraction model; and
        inputting the feature vector to the classification model.

2. The method of claim 1, wherein the feature extraction model is a code embedding model.

3. The method of claim 1, wherein the feature extraction model is a term frequency-inverse document frequency model.

4. The method of claim 1, wherein the classification model is based on at least one of decision trees, random forests, support vector machines, logistic regression, naïve bayes, or K-nearest neighbors.

5. The method of claim 1, wherein the set of training packages is written in a first programming language, and the subject package is written in a second programming language that is different from the first programming language.

6. The method of claim 1, wherein, for at least one training package, inputting the at least one training package to the feature extraction model includes generating a plurality of portions from the at least one training package, and inputting each portion to the feature extraction model which generates a different training feature vector for each portion.

7. The method of claim 6, wherein the plurality of portions are generated based on a rolling window having a predetermined window size and a predetermined step size.

8. The method of claim 1, wherein the subject package is selected from a set of candidate packages identified using domain-specific expertise.

9. A computer system for classifying packages based on generic feature extraction, comprising:
- a processor; and
- a computer storage media that stores computer-executable instructions that are executable by the processor to cause the computer system to at least:
  - identify a set of training packages, the set of training packages including a first subset of training packages that are known to be malicious, and a second subset of training packages that are known to be benign;
  - determine a corresponding set of differences for each training package in the set of training packages, each corresponding set of differences including one or more differences between a first code asset in a current version of the training package and a second code asset in a prior version of the training package;
  - extract a set of training feature vectors from the set of training packages, including inputting the corresponding set of differences for each training package in the set of training packages to a feature extraction model which generates at least one corresponding training feature vector for each training package in the set of training packages, the set of training feature vectors including a first subset of training feature vectors extracted from the first subset of training packages that are known to be malicious and a second subset of training feature vectors extracted from the second subset of training packages that are known to be benign;
  - train a classification model using the set of training feature vectors; and
  - after training the classification model using the set of training feature vectors, classify a subject package as malicious or benign based on:
    - extracting a feature vector for the subject package by inputting the subject package to the feature extraction model; and
    - inputting the feature vector to the classification model.

10. The computer system of claim 9, wherein the feature extraction model is a code embedding model.

11. The computer system of claim 9, wherein the feature extraction model is a term frequency-inverse document frequency model.

12. The computer system of claim 9, wherein the classification model is based on at least one of decision trees, random forests, support vector machines, logistic regression, naïve bayes, or K-nearest neighbors.

13. The computer system of claim 9, wherein the set of training packages is written in a first programming language, and the subject package is written in a second programming language that is different from the first programming language.

14. The computer system of claim 9, wherein, for at least one training package, inputting the at least one training package to the feature extraction model includes generating a plurality of portions from the at least one training package, and inputting each portion to the feature extraction model which generates a different training feature vector for each portion.

15. The computer system of claim 14, wherein the plurality of portions are generated based on a rolling window having a predetermined window size and a predetermined step size.

16. The computer system of claim 9, wherein the subject package is selected from a set of candidate packages identified using domain-specific expertise.

17. A computer program product comprising a computer storage media that stores computer-executable instructions that are executable by a processor to cause a computer system to classify packages based on generic feature extraction, the computer-executable instructions including instructions that are executable by the processor to cause the computer system to at least:
- identify a set of training packages, the set of training packages including a first subset of training packages that are known to be malicious, and a second subset of training packages that are known to be benign;
- determine a corresponding set of differences for each training package in the set of training packages, each corresponding set of differences including one or more differences between a first code asset in a current version of the training package and a second code asset in a prior version of the training package;
- extract a set of training feature vectors from the set of training packages, including inputting the corresponding set of differences for each training package in the set of training packages to a feature extraction model which generates at least one corresponding training feature vector for each training package in the set of training packages, the set of training feature vectors including a first subset of training feature vectors extracted from the first subset of training packages that are known to be malicious and a second subset of training feature vectors extracted from the second subset of training packages that are known to be benign;
- train a classification model using the set of training feature vectors; and
- after training the classification model using the set of training feature vectors, classify a subject package as malicious or benign based on:
  - extracting a feature vector for the subject package by inputting the subject package to the feature extraction model; and
  - inputting the feature vector to the classification model.

18. The computer program product of claim 17, wherein the feature extraction model is a code embedding model.

19. The computer program product of claim 17, wherein the feature extraction model is a term frequency-inverse document frequency model.

20. The computer program product of claim 17, wherein the classification model is based on at least one of decision trees, random forests, support vector machines, logistic regression, naïve bayes, or K-nearest neighbors.

* * * * *